US011574325B1

(12) United States Patent
Yuan et al.

(10) Patent No.: US 11,574,325 B1
(45) Date of Patent: Feb. 7, 2023

(54) MACHINE LEARNING MODEL TRAINED TO PREDICT CONVERSIONS FOR DETERMINING LOST CONVERSIONS CAUSED BY RESTRICTIONS IN AVAILABLE FULFILLMENT WINDOWS OR FULFILLMENT COST

(71) Applicant: Maplebear Inc., San Francisco, CA (US)

(72) Inventors: Wa Yuan, Alameda, CA (US); Ganesh Krishnan, San Francisco, CA (US); Qianyi Hu, San Francisco, CA (US); Aishwarya Balachander, San Ramon, CA (US); George Ruan, San Jose, CA (US); Soren Zeliger, Oakland, CA (US); Mike Freimer, Mill Valley, CA (US); Aman Jain, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/403,400

(22) Filed: Aug. 16, 2021

(51) Int. Cl.
*G06Q 30/02* (2012.01)
*G06N 3/08* (2006.01)
*G06Q 30/06* (2012.01)
*G06Q 10/08* (2012.01)
*G06Q 10/06* (2012.01)

(52) U.S. Cl.
CPC ......... *G06Q 30/0202* (2013.01); *G06N 3/084* (2013.01); *G06Q 10/06312* (2013.01); *G06Q 10/087* (2013.01); *G06Q 30/0201* (2013.01); *G06Q 30/0607* (2013.01); *G06Q 30/0633* (2013.01)

(58) Field of Classification Search
None
See application file for complete search history.

(56) References Cited

U.S. PATENT DOCUMENTS

| 2019/0236740 A1* | 8/2019 | Rao .................. G06N 20/20 |
| 2020/0097900 A1* | 3/2020 | Kibbey ............. G06F 16/212 |
| 2020/0219171 A1* | 7/2020 | Zhuang ........... G06Q 30/0635 |

OTHER PUBLICATIONS

Zhu et al. (Order Fulfillment Cycle Time Estimation for On-Demand Food Delivery; Applied Data Science Track Paper; KDD '20: Proceedings of the 26th ACM SIGKDD International Conference on Knowledge Discovery & Data Mining; Aug. 20, 2020; pp. 2571-2580).*
Krishnan, G., "Modeling the unseen: How Instacart uses Machine Learning to spot lost demand in its fulfillment chain," Jun. 5, 2019, eight pages, [Online] [Retrieved on Oct. 29, 2021] Retrieved from the Internet <URL: https://tech.instacart.com/modeling-the-unseen-6a51c9a02430>.

* cited by examiner

*Primary Examiner* — Matthew D Henry
(74) *Attorney, Agent, or Firm* — Fenwick & West LLP

(57) ABSTRACT

An online concierge system trains a machine learning conversion model that predicts a probability of receiving an order from a user when the user accesses the online concierge system. The conversion model predicts the probability of receiving the order based on a set of input features that include price and availability information. For each access to the online concierge system, the online concierge system applies the conversion model to a current price and availability and to an optimal price availability. The online concierge system generates a metric as the difference between the two predicted probabilities of receiving an order.

16 Claims, 6 Drawing Sheets

MACHINE LEARNING MODEL TRAINED TO PREDICT CONVERSIONS FOR DETERMINING LOST CONVERSIONS CAUSED BY RESTRICTIONS IN AVAILABLE FULFILLMENT WINDOWS OR FULFILLMENT COST

BACKGROUND

This disclosure relates generally to ordering items through an online concierge system, and more specifically to evaluating the effects of limitations on time intervals for fulfillment and cost of fulfillment on the placement of orders by users.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems maintain discrete time windows during which orders are fulfilled, and a user selects a specific time window for an order to be fulfilled and delivered to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

When users access an online concierge system to place an order, factors when the user accesses the online concierge system may prevent the user from placing the order. For example, a user may be unable to identify one or more desired items from a warehouse or may want to obtain an item that a warehouse is unable to provide to the user during a time interval selected for order fulfillment. However, certain factors controlled by the online concierge system may prevent a user from placing an order. For example, the online concierge system may lack shoppers for fulfilling an order during a discrete time interval during which the user seeks to have the order fulfilled. As another example, a price charged by the online concierge system for fulfilling the order during a discrete time interval selected by the user may discourage the user from placing the order.

While conventional online concierge systems can identify accesses to the online concierge system by users that do not result in the online concierge system receiving an order from users, such identification does not allow the online concierge system to account for factors specific to times when users accessed the online concierge system. For example, conventional identification of online concierge system accesses when an order was not received does not allow an online concierge system to determine if the lack of order receipt was from unavailability of one or more items from a warehouse during the user's access to the online concierge system. Similarly, conventional online concierge systems are unable to determine whether factors preventing a user from placing an order when accessing the online concierge system are from factors that the online concierge system can control or caused by delivery restrictions from a warehouse fulfilling an order.

SUMMARY

An online concierge system maintains a plurality of discrete time intervals during which orders received by the online concierge system are fulfilled. For example, the online concierge system maintains multiple two hour intervals for fulfilling orders. This allows a user of the online concierge system to select a discrete time interval for an order provided by the user so items included in the order are delivered to the user at a time within the selected discrete time interval. By selecting a discrete time interval, a user of the online concierge system is able to schedule delivery of items in the order at a future time within the selected discrete time interval, allowing the user to tailor when the order is fulfilled. The online concierge system also associates a price with each discrete time interval, with the price associated with a discrete time interval specifying an amount charged to a user for fulfilling an order during the discrete time interval. Different prices may be associated with different discrete time intervals, and the online concierge system may modify a price associated with discrete time intervals. In other embodiments, the online concierge system allows users to select a time within a continuous time interval to specify a time when items included in the order are delivered.

When a user accesses the online concierge system, the user may generate an order for fulfillment by the online concierge system or the user may exit the online concierge system without generating an order. Various factors may cause a user to exit the online concierge system without generating an order. Certain features, such as availability of items by a warehouse or restrictions on delivery of items to a user from a warehouse are unable to be modified by the online concierge system. However, other features, such as discrete time intervals available for fulfilling an order or a price charged to the user for fulfilling an order are capable of being modified by the online concierge system. Analyzing access to the online system by users that did not result in order generation allows the online concierge system to modify one or more features to increase a likelihood of users generating orders when subsequently accessing the online concierge system.

To evaluate effects of features capable of being modified by the online concierge system on receipt of orders from users, the online concierge system trains a conversion model to output a probability of the online concierge system receiving an order from a user based on a set of input features that are capable of being modified by the online concierge system. The input features include discrete time intervals available for fulfilling an order and prices for fulfilling the order during each discrete time interval available for fulfilling an order, while any other features capable of being modified by the online concierge system are included in various embodiments. Example input features to the conversion model include: discrete time intervals available for fulfilling an order, a time when the online concierge system was accessed, a location for fulfilling the order, a warehouse for fulfilling the order, a price for fulfilling the order, prior orders received from a user who is accessing the online concierge system, a length of time the user has accessed the online concierge system, content from the online concierge system presented to the user, and any other suitable information.

In various embodiments, the online concierge system represents the input features as one or more input vectors determined from values of different input features. Different dimensions of an input vector correspond to different values of input features in various embodiments, and different input vectors correspond to different input features in some embodiments. For example, an availability input vector includes different dimensions corresponding to different discrete time intervals for fulfilling an order, and the availability input vector has a value for a dimension corresponding to a discrete time interval available for fulfilling an order and has a different value for a different dimension corresponding to a different discrete time interval that is not available for fulfilling an order. Similarly, a price input vector has different dimensions corresponding to different discrete time intervals, with a value of a dimension of the price input vector corresponding to a price for fulfilling an order during a discrete time interval corresponding to the dimension of the input vector. Input vectors may include additional information, such as a length of time a user has accessed the online concierge system, a number of orders the online concierge system previously received from a user, an amount of content (e.g., a number of pages, a number of items) the user viewed through the online concierge system, or any other suitable information. In some embodiments, the online concierge system generates a single input vector including a combination of the above-identified information. Generating one or more input vectors for accesses of the online concierge system by users allows the online concierge system to adjust the input features identified for an access to the online concierge system to account for additional functionality provided by the online concierge system or for changes in functionality provided by the online concierge system.

To train the conversion model, the online concierge system retrieves information describing prior accesses of the online concierge system by users and generates training data for the conversion model comprising a plurality of examples each identifying a set of inputs that are features corresponding to users accessing the online concierge system. For example, each example comprises discrete time intervals available for fulfilling an order and a price for fulfilling the order, while in other embodiments each example comprises: discrete time intervals available for fulfilling an order, a time when user accessed the online concierge system, a location for fulfilling the order, a warehouse for fulfilling the order, a price for fulfilling the order, prior orders received from a user who is accessing the online concierge system, a length of time the user has accessed the online concierge system, and content from the online concierge system presented to the user. Each example of the training data is labeled with an indication of whether the example corresponds to the online concierge system receiving an order. For example, the label has a value when the online concierge system received an order and has an alternative value when the online concierge system did not receive an order. Hence, the online concierge system leverages historical information about prior access to the online concierge system by users when the online concierge system received an order and did not receive an order.

The online concierge system applies the conversion model to each of a plurality of examples of the training data. For an example of the training data (which includes a set of input features including discrete time intervals available for fulfilling an order and a price for fulfilling the order during each discrete time interval available for fulfilling an order, and may include one or more additional features), application of the conversion model to the example generates a probability of the online concierge system receiving an order from a user accessing the online concierge system with the set of input features. The online concierge system determines an error term from a difference between the label applied to the example of the training data and the predicted probability of receiving an order from the user. The error term may be generated through any suitable loss function, or combination of loss functions, in various embodiments. For example, the loss function is a mean squared error between a predicted probability of the online concierge system receiving an order and a label applied to the corresponding example of the training data. However, in other embodiments, any loss function or combination of loss functions, may be applied to the predicted probability of the online concierge system receiving an order from a user and the label applied to the corresponding example of the training data to generate the error term.

The online concierge system backpropagates the one or more error terms from the label applied to an example of the training data and the predicted probability of receiving an order from the user through layers of a network comprising the conversion model. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system until the one or more loss functions satisfy one or more criteria. For example, the one or more criteria specify conditions for when the backpropagation of the one or more error terms through the layers of the network is stopped. In some embodiments, the online concierge system uses gradient descent or any other suitable process to minimize the one or more error terms in various embodiments.

In response to the one or more loss functions satisfying the one or more criteria and the online concierge system stopping the backpropagation of the one or more error terms, the online concierge system stores the set of parameters for the layers of the conversion network. For example, the online concierge system 102 stores the weights of connections between nodes in the network as the set of parameters of the network in a non-transitory computer readable storage medium. Hence, training of the conversion model allows the online concierge system to generate and to store a neural network, or other machine learning model, that generates a predicted probability of receiving an order from a user. The conversion model may be any machine learning model, such as a neural network, boosted tree, gradient boosted tree or random forest model in various embodiments. In some examples, the conversion model is trained via a gradient boosting tree when the conversion model is applied to examples of the training data. The online concierge system retrains the conversion model at various intervals, such as at a periodic interval, in various embodiments, allowing the conversion model to account for changes in features of the online concierge system for selection by a user when creating an order.

Alternatively, the online concierge system generates the conversion model as a tree based ensemble model combining multiple decision trees. In various embodiments, the online concierge system selects at least a set of examples of the training data (which each include discrete time intervals available for fulfilling an order and a price for fulfilling the order, and may include one or more other features) and trains a decision tree on each example of the set by applying a decision tree to each example and comparing a predicted probability of the online concierge system receiving an order for an example to a label applied to the example. For example, the decision tree iteratively selects features of an example of the training data and selects a feature causing a loss function to satisfy one or more criteria, for example a feature minimizing a squared error between a probability of receiving an order from a user and a label applied to the example of the training data. The online concierge system sums the loss function over each example of the set to determine a total loss function and selects a feature having a minimum total loss function across the examples of the training data. Subsequently, the online concierge system splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The conversion model comprises the set of trained decision trees, with individual decision trees predicting a probability of the online concierge system receiving an order from a user from the set of input features including at least discrete time intervals available for fulfilling an order and a price for fulfilling the order during each discrete time interval available for fulfilling an order, with the conversion model outputting a predicted probability of the online concierge system receiving an order predicted by at least a threshold number of the decision trees.

As another example, the online concierge system trains multiple decision trees in series, training an initial decision tree as described above and determining a loss function for the initial decision tree based on differences between a predicted probability of the online concierge system receiving an order from input features of an example of the training data and a label applied to the example of the training data. For example, the loss function is a squared error function between the predicted probability of the online concierge system receiving an order from a user and the label applied to the example of the training data. The online concierge system trains another decision tree based on the results of the loss function for each example of the training data and iteratively trains decision trees, with results of the loss function from a decision tree used to train an immediately subsequent decision tree. For example, a gradient of the loss function from a decision tree is used to train an immediately subsequent decision tree. The online concierge system iteratively trains decision trees from the results of the loss function from another decision tree until a specific number of decision trees are trained or until one or more other halting criteria are satisfied. By iteratively propagating a result of a loss function for a decision tree to a subsequent decision tree, an output of a decision tree compensates for errors from an earlier another tree from which the decision tree receives results of the loss function. The output of the conversion prediction model is a combination (e.g., a sum) of the predicted probability of the online concierge system receiving an order from a user output by each of the trained decision trees.

In some embodiments, the conversion model is a combination of multiple models. For example, the conversion model is a combination of a pre-checkout model and a checkout model, with the pre-checkout model and the checkout model trained using one or more of the methods further described above. Different training data is used to train the pre-checkout model and the checkout model in various embodiments, allowing the different models to account for different input features describing information presented to users before an option to checkout by providing an order to the online concierge system and other features presented to users in conjunction with the option to checkout by providing an order to the online concierge system. For example, input features for training the pre-checkout model include: a warehouse for which the user accesses items via the online concierge system, a time when the user accessed the online concierge system, a date when the user accessed the online concierge system, a most recent discrete time interval available for fulfilling an order, a most recent discrete time interval for fulfilling an order, an indication whether greater than a threshold number of discrete time intervals are available for fulfilling an order, a number of orders previously received from the user, a duration of an access of the online concierge system by the user, and any other suitable information. Example features for training the checkout model include: a warehouse for which the user accesses items via the online concierge system, a time when the user accessed the online concierge system, a date when the user accessed the online concierge system, discrete time intervals for fulfilling an order, availability of different discrete time intervals for fulfilling an order, prices for fulfilling an order during different discrete time intervals, an indication whether greater than a threshold number of discrete time intervals are available for fulfilling an order, a number of orders previously received from the user, a duration of an access of the online concierge system by the user, and any other suitable information. The online concierge system trains the pre-checkout conversion model and the checkout conversion model using their respective input features, as further described above, and combines the pre-checkout conversion model and the checkout conversion model as the conversion model. In some embodiments, the conversion model is a sum of the pre-checkout conversion model and the checkout conversion model, while in other embodiments the conversion model is any suitable combination of the pre-checkout conversion model and the checkout conversion model.

Different dimensions of an input vector correspond to different values of input features in various embodiments, and different input vectors correspond to different input features in some embodiments. For example, an availability input vector includes different dimensions corresponding to different discrete time intervals for fulfilling an order, and the availability input vector has a value for a dimension corresponding to a discrete time interval available for fulfilling an order and has a different value for a different dimension corresponding to a different discrete time interval that is not available for fulfilling an order. Similarly, a price input vector has different dimensions corresponding to different discrete time intervals, with a value of a dimension of the price input vector corresponding to a price for fulfilling an order during a discrete time interval corresponding to the dimension of the input vector. Input vectors may include additional information, such as a length of time a user has accessed the online concierge system, a number of orders the online concierge system previously received from a user, an amount of content (e.g., a number of pages of content, one or more types of pages of content, a number of items) the user viewed through the online concierge system, or any other suitable information. In some embodiments, the online concierge system generates a single input vector including a combination of the above-identified information. Generating one or more input vectors for accesses of the online concierge system by users allows the online concierge system to adjust the input features identified for an access to the online concierge system to account for additional functionality provided by the online concierge system or for changes in functionality provided by the online concierge system.

The online concierge system stores the trained conversion model. After training and storing the trained conversion model, when the online concierge system receives an access by a user, the online concierge system applies the trained conversion model to the input features at a time when the access was received to determine a predicted probability of receiving an order from the user. In various embodiments, application of the trained conversion model determines a predicted probability of receiving an order from the user given the discrete time intervals available for order fulfillment and a price for fulfilling an order at the time when the access from the user was received. Hence, the online concierge system determines a predicted probability of receiving an order from the user based on one or more conditions when the user accesses the online concierge system.

To evaluate the probability of receiving the order from the user based on the one or more conditions when the user accessed the online concierge system, the online concierge system also applies the trained conversion model to an optimal set of input features to determine an optimal probability of receiving an order from the user. In various embodiments, the online concierge system stores the optimal set of input features. For example, the optimal set of input features includes a maximum number of discrete time intervals, subject to a time when access from the user was received, for fulfilling orders and a base price for fulfilling orders (or a minimum price for fulfilling orders) during each discrete time interval. In various embodiments, the optimal set of input features accounts for a geographic location of a user from whom the access to the online concierge system was received and a time when the access was received. The online concierge system determines the optimal set of input features for the location and the time when the access was received, allowing the online concierge system to account for certain characteristics outside of the control of the online concierge system. For example, the online concierge system obtains weather information for a geographic region including the location of the access and determines the optimal set of input features for the access accounting for the weather conditions, with certain discrete time windows indicated as unavailable for delivery in response to certain weather conditions associated with the geographic region including the location of the access. Similarly, the optimal set of input features accounts for hours of operation or other restrictions on delivery time (e.g., location regulations limiting times for delivery or sale of certain items) for the geographic region and the time when the accesses was received, indicating in the optimal set of input features that discrete time intervals after a closing time of a warehouse or after a specific time for sale or delivery of certain products as unavailable. This allows the optimal set of input features to account for location or temporal specific factors outside of the control of the online concierge system affecting fulfillment of orders received at the time of the received access in a geographic region including the received access. Hence, application of the trained conversion model to the optimal set of input features allows the online concierge system to determine a predicted probability of receiving an order from the user via the received access when the online concierge system provides the user with an optimal set of conditions at the time the user accesses the online concierge system.

The online concierge system generates a metric from a difference between the predicted probability of receiving an order from the user via the received access when the online concierge system provides the user with an optimal set of conditions at the time the user accesses the online concierge system and the predicted probability of receiving an order from the user based on one or more conditions when the user accesses the online concierge system. In various embodiments, the metric is the difference between the predicted probability of receiving an order from the user via the received access when the online concierge system provides the user with an optimal set of conditions at the time the user accesses the online concierge system and the predicted probability of receiving an order from the user based on one or more conditions when the user accesses the online concierge system. In various embodiments, the online concierge system combines the metrics for accesses received within a time interval and allocates resources, such as shoppers, for the time interval to reduce or to minimize the combined metric for the specific discrete time interval, allowing the online concierge system to allocate resources or to adjust one or more criteria for the specific discrete time interval to minimize the difference between the predicted probability of receiving an order from the user via the received access when the online concierge system provides the user with an optimal set of conditions at the time the user accesses the online concierge system and the predicted probability of receiving an order from the user based on one or more conditions when the user accesses the online concierge system.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
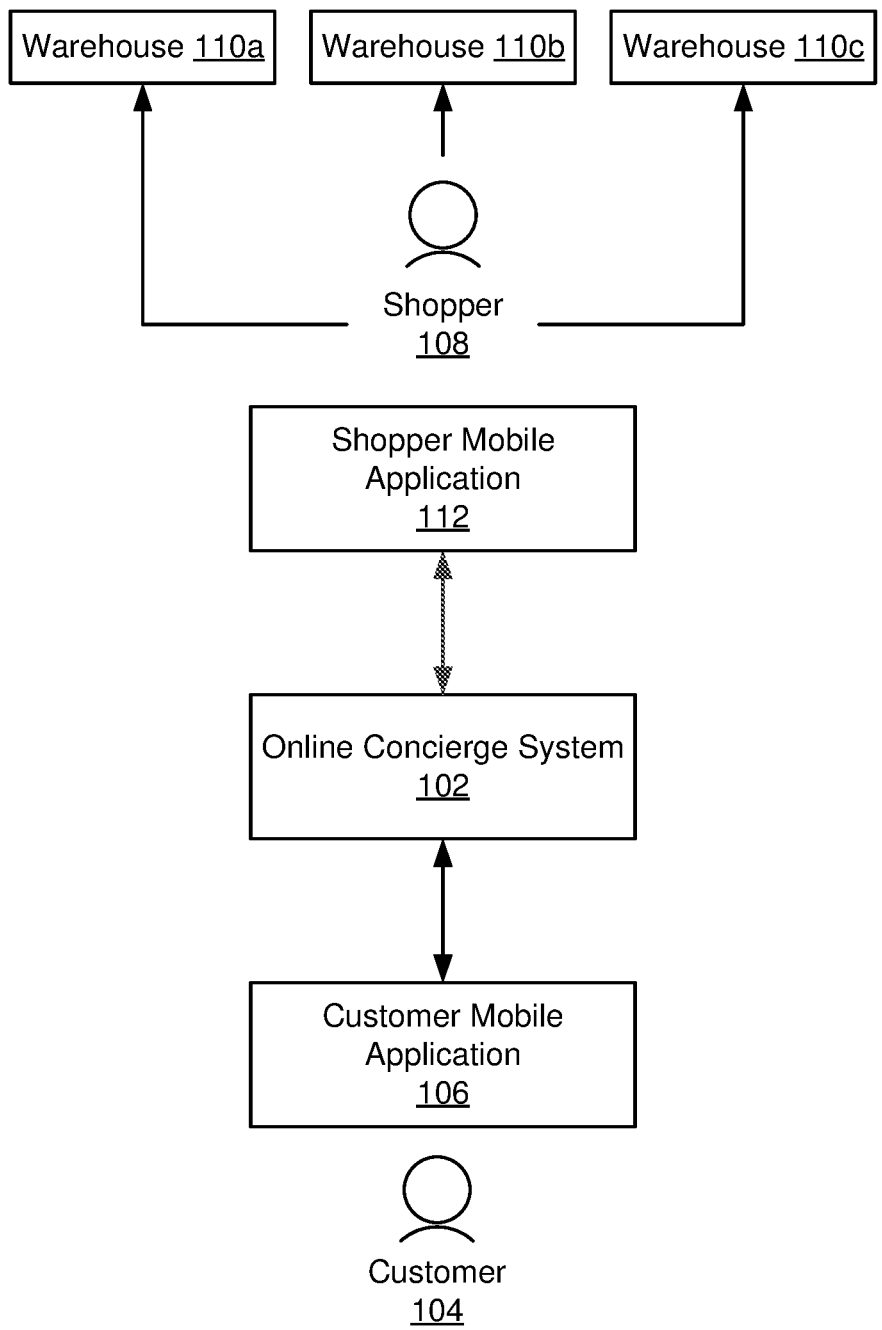
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
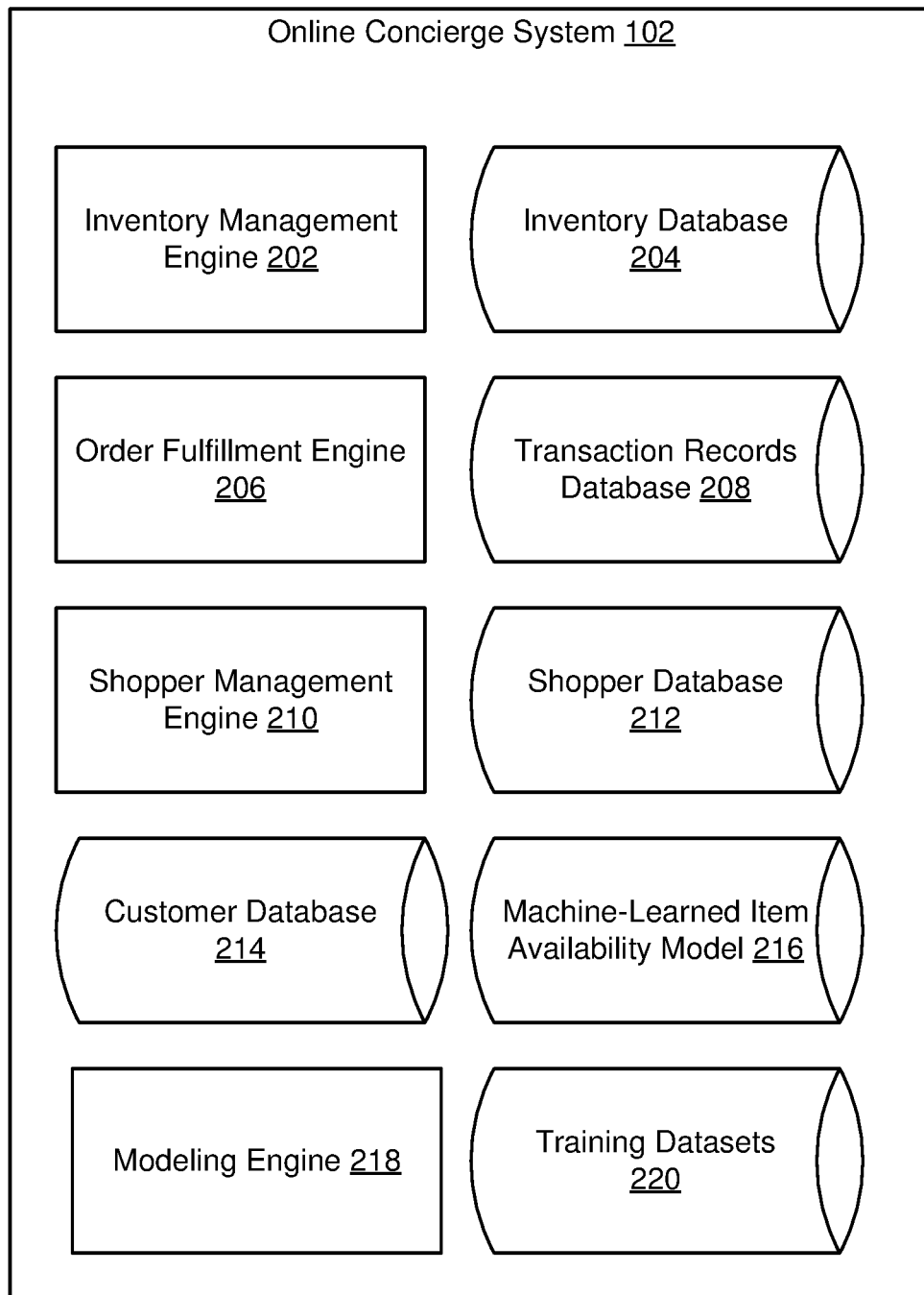
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 generates an estimated time of arrival for an order received from a user, allowing the estimated time of arrival to be displayed in an interface in conjunction with information identifying the order. An option to select the order for short-term fulfillment by the estimated time of arrival is also displayed in the interface, allowing the user to account for the estimated time of arrival when determining whether to select the order for short-term fulfillment. As further described below in conjunction with FIGS. 5-7, the order fulfillment engine accounts for a predicted delivery time for an order from characteristics of the order, as well a policy optimization model trained to determine a modification to the predicted delivery time to optimize a probability of an order being fulfilled after a combination of the modification to the predicted delivery time and a wait time for users from receipt of an order from the user by the online concierge system to fulfillment of the order. As further described below in conjunction with FIGS. 5-7, modifying the predicted delivery time by the modification from the predicted delivery time allows the order fulfillment engine 206 to display an estimated time of arrival for an order that minimizes a wait time for order fulfillment while reducing a probability of the order being fulfilled after a time identified to the user by the order fulfillment engine 206.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training dataset 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from the XGBoost algorithm.

The item probability generated by the machine-learned item availability model 216 may be used to determine instructions delivered to the user 104 and/or shopper 108, as described in further detail below.

The training datasets 220 relate a variety of different factors to known item availability from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained conversion model, further described below in conjunction with FIG. 5 that determines a predicted probability of the online concierge system 102 receiving an order from an access to the online concierge system 102 by a user. The conversion model is trained from prior accesses to the online concierge system 102 and orders previously received by the online concierge system 102. The conversion model receives as inputs features describing an access to the online concierge system 102 by a user, with the features controlled by the online concierge system 102. In various embodiments, the features include discrete time intervals available for fulfilling an order and prices for fulfilling the order during each discrete time interval available for fulfilling an order, while any other features capable of being modified by the online concierge system 102 are included in various embodiments. Other features to the conversion model include: discrete time intervals available for fulfilling an order, a time when the online concierge system 102 was accessed, a location for fulfilling the order, a warehouse 110 for fulfilling the order, a price for fulfilling the order, prior orders received from a user who is accessing the online concierge system 102, a length of time the user has accessed the online concierge system 102, content from the online concierge system 102 presented to the user, and any other suitable information. The trained conversion model may be trained using any suitable method or combination of methods (e.g., supervised learning, unsupervised learning, semi-supervised learning, etc.) and may be any machine learning model, such as a neural network, boosted tree, gradient boosted tree, random forest model, or combination of machine learning models.

As further described below in conjunction with FIGS. 5 and 6, the modeling engine 218 applies the trained conversion model to features describing an access to the online concierge system 102 by a user and to a set of optimal features for the access. As further described below in conjunction with FIGS. 5 and 6, the set of optimal features for the access specifies features providing a maximum number of discrete time intervals for fulfilling an order based on a time when the user accesses the online concierge system 102 and a base (or a minimum) price for fulfilling orders during different discrete time intervals. Based on differences between application of the trained conversion model to the features describing the access to the online concierge system 102 and to the set of optimal features, the modeling engine 218 generates a metric. As further described below in conjunction with FIG. 5, the metric provides a measure of effects of the features describing the access to the online concierge system 102 differing from the set of optimal features on a probability of receiving an order from a user accessing the online concierge system 102.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
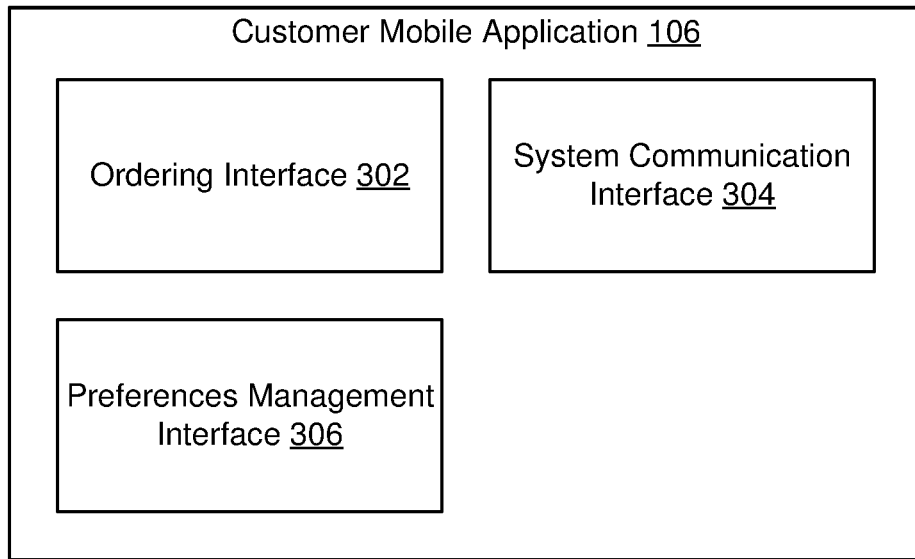
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
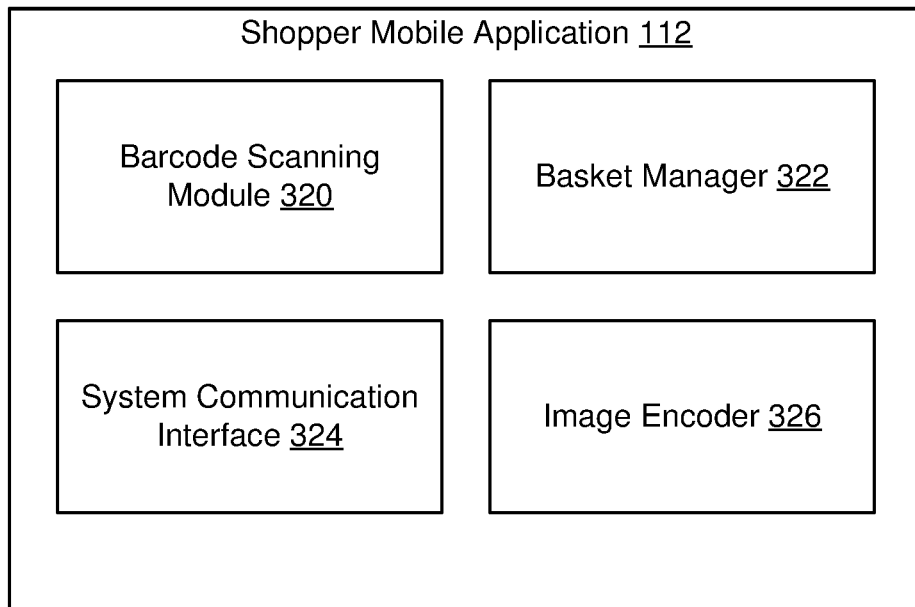
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
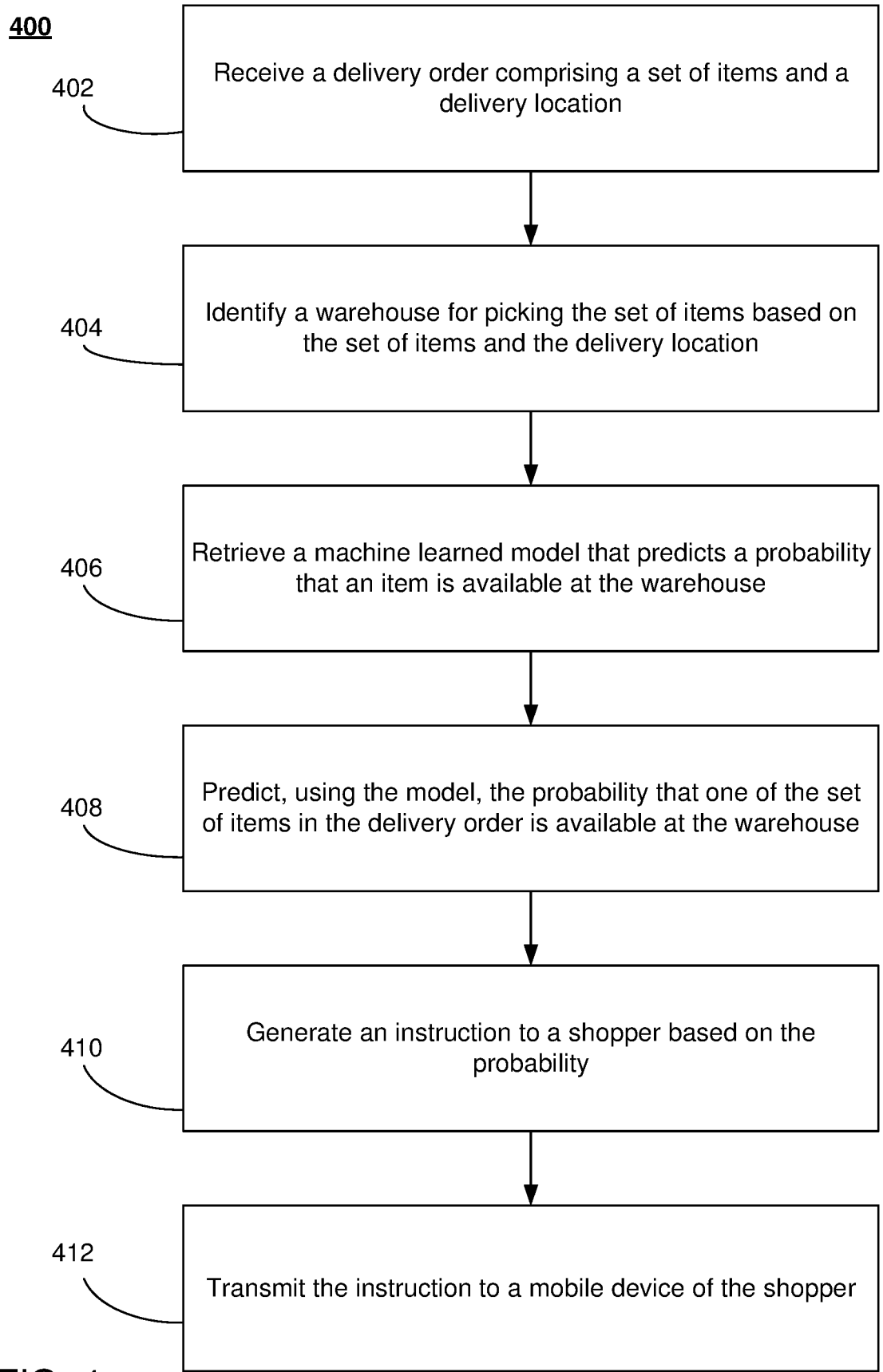
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability.

Figure 5:
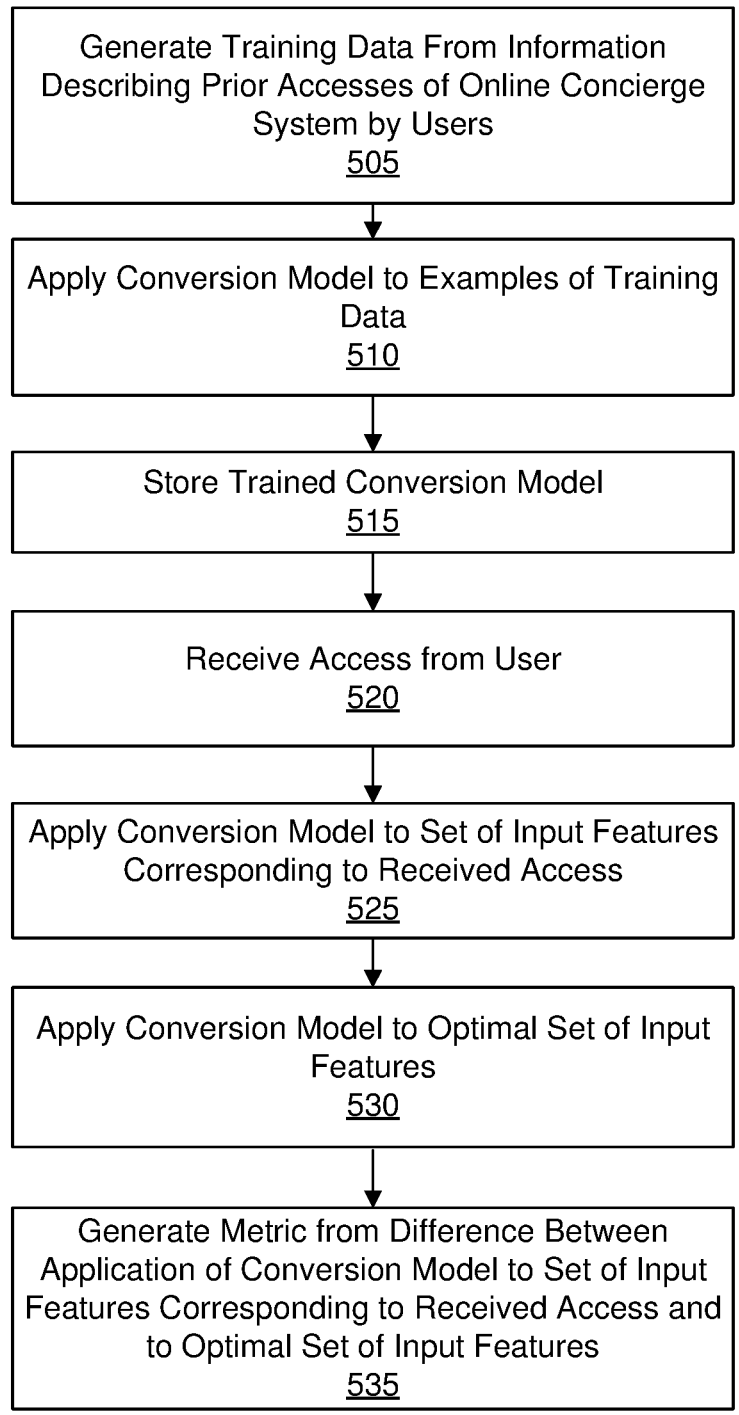
FIG. 5 is a flowchart of a method for determining a metric describing effects of discrete time intervals available for order fulfillment and prices for order fulfillment on receipt of orders by an online concierge system, according to one embodiment.

Determining Effects of Online Concierge System Parameters on User Placement of Orders Through the Online Concierge System FIG. 5 is a flowchart of one embodiment of a method for determining a metric describing effects of discrete time intervals available for order fulfillment and prices for order fulfillment on receipt of orders by an online concierge system 102. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

An online concierge system 102 maintains a plurality of discrete time intervals during which orders received by the online concierge system are fulfilled. For example, the online concierge system maintains multiple two hour intervals for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled. The online concierge system 102 also associates a price with each discrete time interval, with the price associated with a discrete time interval specifying an amount charged to a user for fulfilling an order during the discrete time interval. Different prices may be associated with different discrete time intervals, and the online concierge system 102 may modify a price associated with discrete time intervals. In other embodiments, the online concierge system 102 allows users to select a time within a continuous time interval to specify a time when items included in the order are delivered.

Additionally, the online concierge system 102 allows a user to specify a short-term order for fulfillment when there is shopper availability after the online concierge system 102 receives the order. The online concierge system 102 displays an interface to a user allowing the user to identify an order for short-term fulfillment or to select a discrete time interval during which the order is fulfilled. The interface includes an estimated time of arrival for the order in conjunction with an option for short-term fulfillment of the order to provide the user with an estimate of a time by which the user will receive the order to allow the user to more accurately determine whether to identify the order for short-term fulfillment.

When a user accesses the online concierge system 102, the user may generate an order for fulfillment by the online concierge system 102 or the user may exit the online concierge system 102 without generating an order. Various factors may cause a user to exit the online concierge system 102 without generating an order. Certain features, such as availability of items by a warehouse 110 or restrictions on delivery of items to a user from a warehouse 110 are unable to be modified by the online concierge system 102. However, other features, such as discrete time intervals available for fulfilling an order or a price charged to the user for fulfilling an order are capable of being modified by the online concierge system 102. Analyzing accesses to the online system 102 by users that did not result in order generation allows the online concierge system 102 to modify one or more features to increase a likelihood of users generating orders when subsequently accessing the online concierge system 102.

To evaluate effects of features capable of being modified by the online concierge system 102 on receipt of orders from users, the online concierge system 102 trains a conversion model to output a probability of the online concierge system 102 receiving an order from a user based on a set of input features that are capable of being modified by the online concierge system 102. The input features include discrete time intervals available for fulfilling an order and prices for fulfilling the order during each discrete time interval available for fulfilling an order, while any other features capable of being modified by the online concierge system 102 are included in various embodiments. Example input features to the conversion model include: discrete time intervals available for fulfilling an order, a time when the online concierge system 102 was accessed, a location for fulfilling the order, a warehouse 110 for fulfilling the order, a price for fulfilling the order, prior orders received from a user who is accessing the online concierge system 102, a length of time the user has accessed the online concierge system 102, content from the online concierge system 102 presented to the user, and any other suitable information.

In various embodiments, the online concierge system 102 represents the input features as one or more input vectors determined from values of different input features. Different dimensions of an input vector correspond to different values of input features in various embodiments, and different input vectors correspond to different input features in some embodiments. For example, an availability input vector includes different dimensions corresponding to different discrete time intervals for fulfilling an order, and the availability input vector has a value for a dimension corresponding to a discrete time interval available for fulfilling an order and has a different value for a different dimension corresponding to a different discrete time interval that is not available for fulfilling an order. Similarly, a price input vector has different dimensions corresponding to different discrete time intervals, with a value of a dimension of the price input vector corresponding to a price for fulfilling an order during a discrete time interval corresponding to the dimension of the input vector. Input vectors may include additional information, such as a length of time a user has accessed the online concierge system 102, a number of orders the online concierge system 102 previously received from a user, an amount of content (e.g., a number of pages, a number of items) the user viewed through the online concierge system 102, or any other suitable information. In some embodiments, the online concierge system 102 generates a single input vector including a combination of the above-identified information. Generating one or more input vectors for accesses of the online concierge system 102 by users allows the online concierge system 102 to adjust the input features identified for an access to the online concierge system 102 to account for additional functionality provided by the online concierge system 102 or for changes in functionality provided by the online concierge system 102.

To train the conversion model, the online concierge system 102 retrieves information describing prior accesses of the online concierge system 102 by users and generates 505 training data for the conversion model comprising a plurality of examples each identifying a set of inputs that are features corresponding to users accessing the online concierge system 102, as further described above. For example, each example comprises discrete time intervals available for fulfilling an order and a price for fulfilling the order, while in other embodiments each example comprises: discrete time intervals available for fulfilling an order, a time when the user accessed the online concierge system 102, a location for fulfilling the order, a warehouse 110 for fulfilling the order, a price for fulfilling the order, prior orders received from a user who is accessing the online concierge system 102, a length of time the user has accessed the online concierge system 102, and content from the online concierge system 102 presented to the user. Each example of the training data is labeled with an indication of whether the example corresponds to the online concierge system 102 receiving an order. For example, the label has a value when the online concierge system 102 received an order and has an alternative value when the online concierge system 102 did not receive an order. Hence, the online concierge system 102 leverages historical information about prior accesses to the online concierge system 102 by users when the online concierge system 102 received an order and did not receive an order.

The online concierge system 102 applies 510 the conversion model to each of a plurality of examples of the training data. For an example of the training data (which includes a set of input features including discrete time intervals available for fulfilling an order and a price for fulfilling the order during each discrete time interval available for fulfilling an order, and may include one or more additional features), application of the conversion model to the example generates a probability of the online concierge system 102 receiving an order from a user accessing the online concierge system 102 with the set of input features. The online concierge system 102 determines an error term from a difference between the label applied to the example of the training data and the predicted probability of receiving an order from the user. The error term may be generated through any suitable loss function, or combination of loss functions, in various embodiments. For example, the loss function is a mean squared error between a predicted probability of the online concierge system 102 receiving an order and a label applied to the corresponding example of the training data. However, in other embodiments, any loss function or combination of loss functions, may be applied to the predicted probability of the online concierge system 102 receiving an order from a user and the label applied to the corresponding example of the training data to generate the error term.

The online concierge system 102 backpropagates the one or more error terms from the label applied to an example of the training data and the predicted probability of receiving an order from the user through layers of a network comprising the conversion model. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the conversion network. For example, the online concierge system 102 stores the weights of connections between nodes in the network as the set of parameters of the network in a non-transitory computer readable storage medium. Hence, training of the conversion model allows the online concierge system 102 to generate and to store a neural network, or other machine learning model, that generates a predicted probability of receiving an order from a user. The conversion model may be any machine learning model, such as a neural network, boosted tree, gradient boosted tree or random forest model in various embodiments. In some examples, the conversion model is trained via a XGBoost process when the conversion model is applied 510 to examples of the training data. The online concierge system 102 retrains the conversion model at various intervals, such as at a periodic interval, in various embodiments, allowing the conversion model to account for changes in features of the online concierge system 102 for selection by a user when creating an order.

Alternatively, the online concierge system 102 generates the conversion model as a tree based ensemble model combining multiple decision trees. In various embodiments, the online concierge system 102 selects at least a set of examples of the training data (which each include discrete time intervals available for fulfilling an order and a price for fulfilling the order, and may include one or more other features) and trains a decision tree on each example of the set by applying a decision tree to each example and comparing a predicted probability of the online concierge system 102 receiving an order for an example to a label applied to the example. For example, the decision tree iteratively selects features of an example of the training data and selects a feature causing a loss function to satisfy one or more criteria, for example a feature minimizing a squared error between a probability of receiving an order from a user and a label applied to the example of the training data. The online concierge system 102 sums the loss function over each example of the set to determine a total loss function and selects a feature having a minimum total loss function across the examples of the training data. Subsequently, the online concierge system 102 splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system 102 trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The conversion model comprises the set of trained decision trees, with individual decision trees predicting a probability of the online concierge system 102 receiving an order from a user from the set of input features including at least discrete time intervals available for fulfilling an order and a price for fulfilling the order during each discrete time interval available for fulfilling an order, with the conversion model outputting a predicted probability of the online concierge system 102 receiving an order predicted by at least a threshold number of the decision trees.

As another example, the online concierge system 102 trains multiple decision trees in series, training an initial decision tree as described above and determining a loss function for the initial decision tree based on differences between a predicted probability of the online concierge system 102 receiving an order from input features of an example of the training data and a label applied to the example of the training data. For example, the loss function is a squared error function between the predicted probability of the online concierge system 102 receiving an order from a user and the label applied to the example of the training data. The online concierge system 102 trains another decision tree based on the results of the loss function for each example of the training data and iteratively trains decision trees, with results of the loss function from a decision tree used to train an immediately subsequent decision tree. For example, a gradient of the loss function from a decision tree is used to train an immediately subsequent decision tree. The online concierge system 102 iteratively trains decision trees from the results of the loss function from another decision tree until a specific number of decision trees are trained or until one or more other halting criteria are satisfied. By iteratively propagating a result of a loss function for a decision tree to a subsequent decision tree, an output of a decision tree compensates for errors from an earlier another tree from which the decision tree receives results of the loss function. The output of the conversion prediction model is a combination (e.g., a sum) of the predicted probability of the online concierge system 102 receiving an order from a user output by each of the trained decision trees.

In some embodiments, the conversion model is a combination of multiple models. For example, the conversion model is a combination of a pre-checkout model and a checkout model, with the pre-checkout model and the checkout model trained 510 using one or more of the methods further described above. Different training data is used to train the pre-checkout model and the checkout model in various embodiments, allowing the different models to account for different input features describing information presented to users before an option to checkout by providing an order to the online concierge system and other features presented to users in conjunction with the option to checkout by providing an order to the online concierge system. 102. For example, input features for training the pre-checkout model include: a warehouse 110 for which the user accesses items via the online concierge system 102, a time when the user accessed the online concierge system 102, a date when the user accessed the online concierge system 102, a most recent discrete time interval available for fulfilling an order, a most recent discrete time interval for fulfilling an order, an indication whether greater than a threshold number of discrete time intervals are available for fulfilling an order, a number of orders previously received from the user, a duration of an access of the online concierge system 102 by the user, and any other suitable information. Example features for training the checkout model include: a warehouse 110 for which the user accesses items via the online concierge system 102, a time when the user accessed the online concierge system 102, a date when the user accessed the online concierge system 102, discrete time intervals for fulfilling an order, availability of different discrete time intervals for fulfilling an order, prices for fulfilling an order during different discrete time intervals, an indication whether greater than a threshold number of discrete time intervals are available for fulfilling an order, a number of orders previously received from the user, a duration of an access of the online concierge system 102 by the user, and any other suitable information. The online concierge system 102 trains the pre-checkout conversion model and the checkout conversion model using their respective input features, as further described above, and combines the pre-checkout conversion model and the checkout conversion model as the conversion model. In some embodiments, the conversion model is a sum of the pre-checkout conversion model and the checkout conversion model, while in other embodiments the conversion model is any suitable combination of the pre-checkout conversion model and the checkout conversion model.

Different dimensions of an input vector correspond to different values of input features in various embodiments, and different input vectors correspond to different input features in some embodiments. For example, an availability input vector includes different dimensions corresponding to different discrete time intervals for fulfilling an order, and the availability input vector has a value for a dimension corresponding to a discrete time interval available for fulfilling an order and has a different value for a different dimension corresponding to a different discrete time interval that is not available for fulfilling an order. Similarly, a price input vector has different dimensions corresponding to different discrete time intervals, with a value of a dimension of the price input vector corresponding to a price for fulfilling an order during a discrete time interval corresponding to the dimension of the input vector. Input vectors may include additional information, such as a length of time a user has accessed the online concierge system 102, a number of orders the online concierge system 102 previously received from a user, an amount of content (e.g., a number of pages, a number of items) the user viewed through the online concierge system 102, or any other suitable information. In some embodiments, the online concierge system 102 generates a single input vector including a combination of the above-identified information. Generating one or more input vectors for accesses of the online concierge system 102 by users allows the online concierge system 102 to adjust the input features identified for an access to the online concierge system 102 to account for additional functionality provided by the online concierge system 102 or for changes in functionality provided by the online concierge system 102.

The online concierge system 102 stores 515 the trained conversion model. After training and storing 515 the trained conversion model, when the online concierge system 102 receives 520 an access by a user, the online concierge system 102 applies 525 the trained conversion model to the input features at a time when the access was received to determine a predicted probability of receiving an order from the user. In various embodiments, application of the trained conversion model determines a predicted probability of receiving an order from the user given the discrete time intervals available for order fulfillment and a price for fulfilling an order at the time when the access from the user was received 520. Hence, the online concierge system 102 determines a predicted probability of receiving an order from the user based on one or more conditions when the user accesses the online concierge system 102.

To evaluate the probability of receiving the order from the user based on the one or more conditions when the user accessed the online concierge system 102, the online concierge system 102 also applies 530 the trained conversion model to an optimal set of input features to determine an optimal probability of receiving an order from the user. In various embodiments, the online concierge system 102 stores an optimal set of input features for different times when an access is received 605. For example, the optimal set of input features includes a maximum number of discrete time intervals, subject to a time when access from the user was received 520, for fulfilling orders and a base price for fulfilling orders (or a minimum price for fulfilling orders) during each discrete time interval. In various embodiments, the optimal set of input features accounts for a geographic location of a user from whom the access to the online concierge system 102 was received 520 and a time when the access was received 520. The online concierge system 102 determines the optimal set of input features for the location and the time when the accesses was received 520, allowing the online concierge system 102 to account for certain characteristics outside of the control of the online concierge system 102. For example, the online concierge system 102 obtains weather information for a geographic region including the location of the access and determines the optimal set of input features for the access accounting for the weather conditions, with certain discrete time windows indicated as unavailable for delivery in response to certain weather conditions associated with the geographic region including the location of the access. Similarly, the optimal set of input features accounts for hours of operation or other restrictions on delivery time (e.g., location regulations limiting times for delivery or sale of certain items) for the geographic region and the time when the accesses was received 520, indicating in the optimal set of input features that discrete time intervals after a closing time of a warehouse 110 or after a specific time for sale or delivery of certain products as unavailable. This allows the optimal set of input features to account for location or temporal specific factors outside of the control of the online concierge system 102 affecting fulfillment of orders received at the time of the received access in a geographic region including the received access. Hence, application of the trained conversion model to the optimal set of input features allows the online concierge system 120 to determine a predicted probability of receiving an order from the user via the received access when the online concierge system 102 provides the user with an optimal set of conditions at the time the user accesses the online concierge system 102.

The online concierge system 102 generates 535 a metric from a difference between the predicted probability of receiving an order from the user via the received access when the online concierge system 102 provides the user with an optimal set of conditions at the time the user accesses the online concierge system 102 and the predicted probability of receiving an order from the user based on one or more conditions when the user accesses the online concierge system 102. In various embodiments, the metric is the difference between the predicted probability of receiving an order from the user via the received access when the online concierge system 102 provides the user with an optimal set of conditions at the time the user accesses the online concierge system 102 and the predicted probability of receiving an order from the user based on one or more conditions when the user accesses the online concierge system 102. The online concierge system 102 may generate a time interval specific metric by summing differences between predicted probabilities of receiving an order from the user via received accesses when the online concierge system 102 provides the user with an optimal set of conditions at times users accessed the online concierge system 102 within the specific time interval and corresponding predicted probabilities of receiving an order from the users based on one or more conditions when the users accessed the online concierge system 102 during the specific time interval and dividing the summed differences by a sum of accesses received by the online concierge system during the specific time interval and orders fulfilled during the specific time interval. In some embodiments, the online concierge system 102 selects a set of accesses received from users identifying locations within a geographic region during a specific time interval and generates a region-specific metric for the specific time interval by summing differences between predicted probabilities of receiving an order from the user via received accesses when the online concierge system 102 provides the user with an optimal set of conditions at times users accessed the online concierge system 102 within the specific time interval and identified locations within the particular geographic region and corresponding predicted probabilities of receiving an order from the users based on one or more conditions when the users accessed the online concierge system 102 during times within the specific time interval and identifying locations within the particular geographic region and dividing the summed differences by a sum of accesses received by the online concierge system during the specific time interval and identifying locations within the particular geographic region and orders fulfilled during the specific time interval within the particular geographic region.

In various embodiments, the online concierge system 102 uses the time interval specific metric for a discrete time interval to minimize the time interval specific metric for the discrete time interval, which reduces a likelihood of the online concierge system 102 not receiving an order from a user accessing the online concierge system 102 during the discrete time interval. Similarly, the online concierge system 102 may use a region-specific metric for a specific time interval to adjust a number of shoppers allocated to a specific geographic region during the specific time interval to minimize a likelihood of the online concierge system 102 not receiving an order from a user accessing the online concierge system 102 during the discrete time interval and identifying a location within the specific geographic region.

Hence, the metric from the difference between the predicted probability of receiving an order from the user via the received access when the online concierge system 102 provides the user with an optimal set of conditions at the time the user accesses the online concierge system 102 and the predicted probability of receiving an order from the user based on one or more conditions when the user accesses the online concierge system 102 allows the online concierge system 102 to allocate resources or to adjust one or more criteria for discrete time intervals to minimize the difference between the predicted probability of receiving an order from the user via the received access when the online concierge system 102 provides the user with an optimal set of conditions at the time the user accesses the online concierge system 102 and the predicted probability of receiving an order from the user based on one or more conditions when the user accesses the online concierge system 102.

Figure 6:
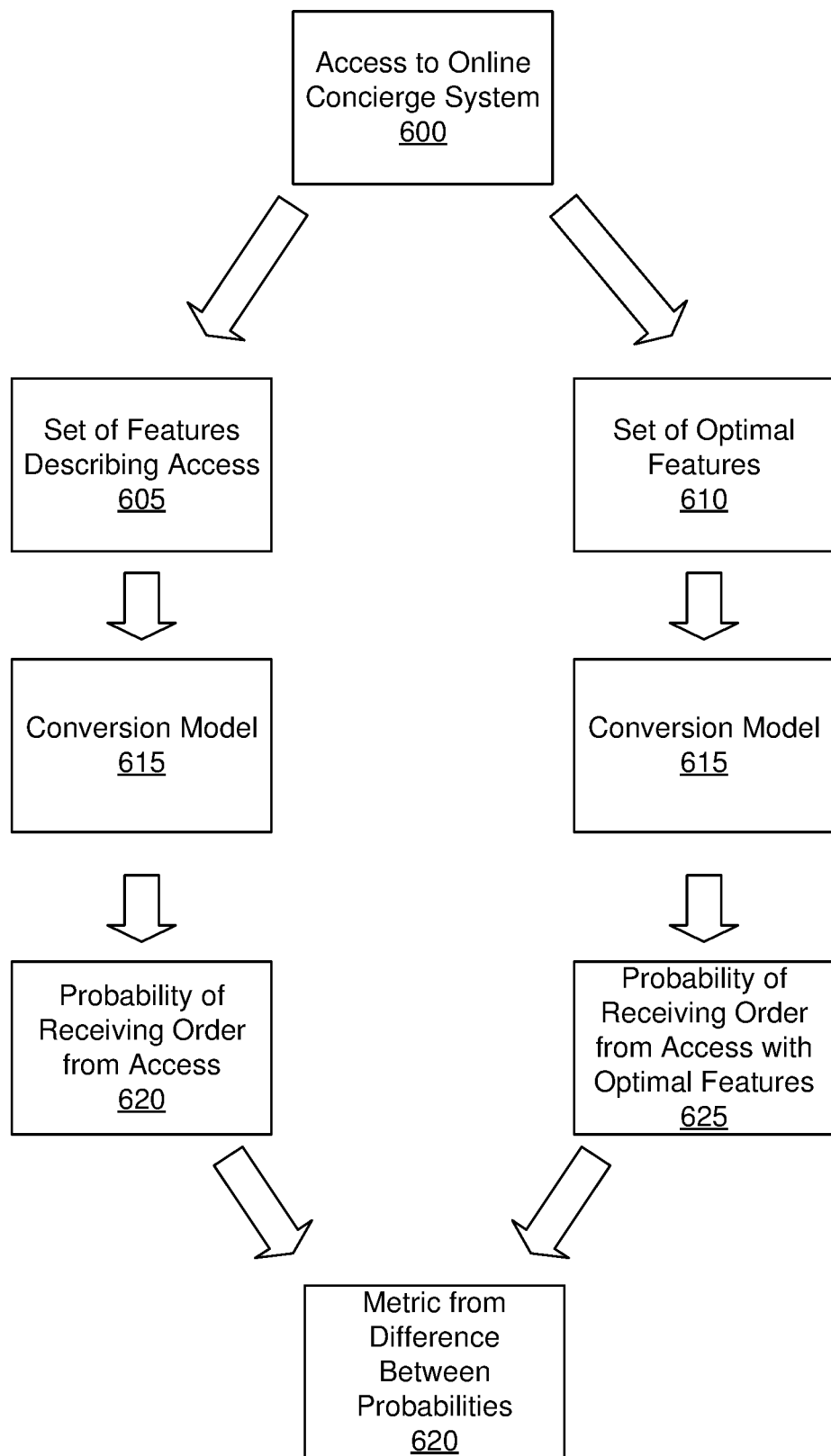
FIG. 6 is a process flow diagram of a method for determining a metric describing effects of discrete time intervals available for order fulfillment and prices for order fulfillment on receipt of orders by an online concierge system, according to one embodiment.

FIG. 6 is a process flow diagram of one embodiment of a method for determining a metric describing effects of discrete time intervals available for order fulfillment and prices for order fulfillment on receipt of orders by an online concierge system 102. As shown in FIG. 6, the online concierge system 102 receives an access 600 from a user. For example, the online concierge system 102 receives a selection of a warehouse 110 from a user, receives a query for one or more items from the user, receives a selection of an item from a user, or receives any other input or request for content from a user. The online concierge system 102 determines a set 605 of features describing the access 600 by the user. As further described above in conjunction with FIG. 5, the set 605 of features identifies discrete time intervals available for fulfilling an order when the access 600 was received as well as prices for fulfilling the order during different discrete time intervals. In various embodiments, the set 605 of features may include any suitable additional information, such as a length of time a user has accessed the online concierge system 102, a number of orders the online concierge system 102 previously received from a user, an amount of content (e.g., a number of pages, a number of items) the user viewed through the online concierge system 102, or any other suitable information.

Additionally, the online concierge system 102 retrieves a set of optimal features 610 for the access 600. The optimal set of features 610 includes a maximum number of discrete time intervals, subject to a time when access 600 from the user was received for fulfilling orders and a base price for fulfilling orders (or a minimum price for fulfilling orders) during each discrete time interval. In various embodiments, the optimal set of input features accounts for a geographic location of a user from whom the access 600 was received as well as a time when the access 600 was received. Hence, the set of optimal features 610 does not include discrete time intervals later than a closing time of a warehouse 110 or discrete time intervals during which certain items are unable to be delivered. This allows the set of optimal features 610 to identify a maximum number of discrete time intervals available for fulfilling an order at a time when the access 600 was received.

The online concierge system 102 applies a trained conversion model 615 to the set 605 of features describing the access 600 and to the set of optimal features 610. The trained conversion model 615 is further described above in conjunction with FIG. 5. Application of the trained conversion model 615 to the set 605 of features describing the access 600 generates a probability 620 of the online concierge system 102 receiving an order from the access 600. Similarly, application of the trained conversion model 615 to the optimal set 610 of features generates a probability 625 of the online concierge system 102 receiving an order if the set of optimal features 615 were available when the access 600 was received. In various embodiments, the online concierge system 102 determines a metric 630 from a difference between the probability 625 of the online concierge system 102 receiving an order if the set of optimal features 615 were available when the access 600 was received and the probability 620 of the online concierge system 102 receiving an order from the access 600. Generating the metric 630 from a difference between the probability 625 of the online concierge system 102 receiving an order if the set of optimal features 615 were available when the access 600 was received and the probability 620 of the online concierge system 102 receiving an order from the access 600 allows the online concierge system 102 to mitigate potential errors in the conversion model 615 by applying the conversion model 615 to both the set 605 of features describing the access 600 and the set of optimal features 610.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product comprising a non-transitory computer readable storage medium having instructions encoded thereon that, when executed by a processor, cause the processor to:
    retrieve a conversion prediction model that was generated by:
        obtaining training data comprising a plurality of examples, each example comprising a set of input features including discrete time intervals available for fulfilling an order and a price for fulfilling the order during each discrete time interval available for fulfilling the order, a label applied to each example indicating whether an online concierge system received an order
        initializing a conversion network that comprises a plurality of layers of a neural network, where the conversion network is configured to receive a set of features including discrete time intervals available for fulfilling the order and a price for fulfilling the order during each discrete time interval available for fulfilling the order and to generate a predicted probability of the online concierge system receiving an order; and
    for each of a plurality of the examples of the training data:
        applying the conversion network to the received set of features;
        backpropagating one or more error terms obtained from one or more loss functions to update a set of parameters of the conversion network, the backpropagating performed through the conversion network and one or more of the error terms based on a difference between a label applied to the example and the predicted probability of the online concierge system receiving the order; and
        stopping the backpropagation after the one or more loss functions satisfy one or more criteria;
    receiving an access to the online concierge system from a user;
    applying the conversion prediction model to a set of features describing the access to the online concierge system, the set of features describing an access to the online concierge system including discrete time intervals available for fulfilling the order when the access was received and a price for fulfilling the order during each discrete time interval available for fulfilling the order when the access was received;
    applying the conversion prediction model to an optimal set of input features including a maximum number of discrete time intervals, subject to a time when the access was received and a base price for fulfilling orders during each discrete time interval; and
    generating, by the online concierge system, a metric based on a difference between a predicted probability of the online concierge system receiving an order from the received access for the optimal set of input features and a predicted probability of the online concierge system receiving the order from the received access for the set of features describing the access to the online concierge system.

2. The computer program product of claim 1, wherein the optimal set of input features accounts for a geographic region of the access and a time of the access.

3. The computer program product of claim 2, wherein the optimal set of input features identifies one or more discrete time intervals as unavailable for fulfilling the order based on the geographic region of the access or a time of the access.

4. The computer program product of claim 3, wherein the optimal set of input features identifies one or more discrete time intervals occurring after a closing time of a warehouse identified by the access as unavailable for fulfilling the order.

5. The computer program product of claim 3, wherein the optimal set of input features identifies one or more discrete time intervals as unavailable for fulfilling the order based on restrictions for purchasing one or more items for the geographic region of the access.

6. The computer program product of claim 1, wherein the set of input features comprises an availability input vector including different dimensions corresponding to different discrete time intervals for fulfilling the order and a value for a dimension indicating whether a discrete time interval corresponding to the dimension is available for fulfilling the order.

7. The computer program product of claim 1, wherein the set of input features includes a price input vector having different dimensions corresponding to different discrete time intervals, with a value of a dimension specifying a price for fulfilling the order during a discrete time interval corresponding to the dimension.

8. The computer program product of claim 1, wherein the set of input features further includes: a length of time a user accessed the online concierge system, a number of order the online concierge system received from the user, an amount of content the user viewed through the online concierge system, and any combination thereof.

9. A computer program product comprising a non-transitory computer readable storage medium having instructions encoded thereon that, when executed by a processor, cause the processor to:
    retrieve a conversion prediction model that was generated by:
        obtaining training data comprising a plurality of examples, each example comprising a set of input features including discrete time intervals available for fulfilling an order and a price for fulfilling the order during each discrete time interval available for fulfilling the order, a label applied to each example indicating whether an online concierge system received an order;
        training a plurality of decision trees where a result of a loss function of a decision tree is an input to a subsequent decision tree, where the conversion model is configured to receive the set of input features including discrete time intervals available for fulfilling an order and a price for fulfilling the order during each discrete time interval available for fulfilling the order and to generate a predicted probability of the online concierge system receiving an order; and for each of a plurality of the examples of the training data:
applying a decision tree to the set of input features;
iteratively propagating a result of one or more loss functions from the decision tree to the subsequent decision tree for the plurality of decision trees, one or more error terms based on a difference between a label applied to the example and the predicted probability of the online concierge system receiving an order; and
stopping the propagation after one or more halting criteria are satisfied;
receiving an access to the online concierge system from a user;
applying the conversion prediction model to a set of features describing the access to the online concierge system, the set of features describing an access to the online concierge system including discrete time intervals available for fulfilling the order when the access was received and a price for fulfilling the order during each discrete time interval available for fulfilling the order when the access was received;
applying the conversion prediction model to an optimal set of input features including a maximum number of discrete time intervals, subject to a time when the access was received and a base price for fulfilling orders during each discrete time interval; and
generating, by the online concierge system, a metric based on a difference between a predicted probability of the online concierge system receiving an order from the received access for the optimal set of input features and a predicted probability of the online concierge system receiving the order from the received access for the set of features describing the access to the online concierge system.

10. The computer program product of claim 9, wherein the optimal set of input features accounts for a geographic region of the access and a time of the access.

11. The computer program product of claim 10, wherein the optimal set of input features identifies one or more discrete time intervals as unavailable for fulfilling the order based on the geographic region of the access or a time of the access.

12. The computer program product of claim 11, wherein the optimal set of input features identifies one or more discrete time intervals occurring after a closing time of a warehouse identified by the access as unavailable for fulfilling the order.

13. The computer program product of claim 11, wherein the optimal set of input features identifies one or more discrete time intervals as unavailable for fulfilling the order based on restrictions for purchasing one or more items for the geographic region of the access.

14. The computer program product of claim 9, wherein the set of input features comprises an availability input vector including different dimensions corresponding to different discrete time intervals for fulfilling the order and a value for a dimension indicating whether a discrete time interval corresponding to the dimension is available for fulfilling the order.

15. The computer program product of claim 9, wherein the set of input features includes a price input vector having different dimensions corresponding to different discrete time intervals, with a value of a dimension specifying a price for fulfilling the order during a discrete time interval corresponding to the dimension.

16. The computer program product of claim 9, wherein the set of input features further includes: a length of time a user accessed the online concierge system, a number of order the online concierge system received from the user, an amount of content the user viewed through the online concierge system, and any combination thereof.

* * * * *